(12) United States Patent
Vanderspek et al.

(10) Patent No.: US 8,276,132 B1
(45) Date of Patent: *Sep. 25, 2012

(54) SYSTEM AND METHOD FOR REPRESENTING AND MANAGING A MULTI-ARCHITECTURE CO-PROCESSOR APPLICATION PROGRAM

(75) Inventors: Julius Vanderspek, San Jose, CA (US); Nicholas Patrick Wilt, Rochester, NY (US); Jayant Kolhe, Milpitas, CA (US); Ian A. Buck, San Jose, CA (US); Bastiaan Aarts, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1332 days.

This patent is subject to a terminal disclaimer.

(21) Appl. No.: 11/938,747

(22) Filed: Nov. 12, 2007

(51) Int. Cl.
*G06F 9/45* (2006.01)

(52) U.S. Cl. .................. 717/149; 717/138; 717/151

(58) Field of Classification Search .................. None
See application file for complete search history.

(56) References Cited

U.S. PATENT DOCUMENTS

| | | | | |
|---|---|---|---|---|
| 5,339,419 A * | 8/1994 | Chan et al. | ...................... | 717/147 |
| 5,432,937 A * | 7/1995 | Tevanian et al. | ............... | 717/162 |
| 5,583,983 A * | 12/1996 | Schmitter | ..................... | 717/138 |
| 5,604,905 A * | 2/1997 | Tevanian et al. | ............... | 717/140 |
| 5,968,162 A * | 10/1999 | Yard | ............................. | 712/203 |
| 5,999,728 A * | 12/1999 | Cable | ........................... | 717/105 |
| 6,091,897 A * | 7/2000 | Yates et al. | ..................... | 717/138 |
| 6,158,047 A * | 12/2000 | Le et al. | ......................... | 717/153 |
| 6,374,308 B1 * | 4/2002 | Kempf et al. | ................. | 719/316 |
| 6,502,237 B1 * | 12/2002 | Yates et al. | ..................... | 717/136 |
| 6,732,220 B2 * | 5/2004 | Babaian et al. | ................... | 711/6 |
| 6,922,735 B2 * | 7/2005 | Chang | ............................... | 710/5 |
| 7,178,130 B2 * | 2/2007 | Chuang et al. | ................. | 717/120 |
| 7,243,333 B2 * | 7/2007 | Gschwind et al. | ............. | 717/107 |
| 7,260,702 B2 * | 8/2007 | Vega et al. | ..................... | 711/203 |
| 7,493,472 B2 * | 2/2009 | Baxter | ........................... | 712/43 |

(Continued)

FOREIGN PATENT DOCUMENTS

WO  WO 2008/127610  10/2008

(Continued)

OTHER PUBLICATIONS

Shalf et al., GridRun: A lightweigh packaging and execution environment for compact, umlti-architecture binaries, published by Lawrence Berkeley Natinal Laboratory, Feb. 1, 2004, pp. 1-9.*

(Continued)

*Primary Examiner* — Tuan Q Dam
*Assistant Examiner* — Zheng Wei
(74) *Attorney, Agent, or Firm* — Patterson & Sheridan, LLP (57) ABSTRACT

One embodiment of the present invention sets forth a technique for representing and managing a multi-architecture co-processor application program. Source code for co-processor functions is compiled in two stages. The first stage incorporates a majority of the computationally intensive processing steps associated with co-processor code compilation. The first stage generates virtual assembly code from the source code. The second stage generates co-processor machine code from the virtual assembly. Both the virtual assembly and co-processor machine code may be included within the co-processor enabled application program. A co-processor driver uses a description of the currently available co-processor to select between virtual assembly and co-processor machine code. If the virtual assembly code is selected, then the co-processor driver compiles the virtual assembly into machine code for the current co-processor.

20 Claims, 8 Drawing Sheets

U.S. PATENT DOCUMENTS

| | | | | |
|---|---|---|---|---|
| 7,519,964 | B1* | 4/2009 | Islam et al. | 717/177 |
| 7,694,291 | B2* | 4/2010 | Chen et al. | 717/162 |
| 7,861,240 | B2* | 12/2010 | Teranishi | 717/172 |
| 7,941,791 | B2* | 5/2011 | Wang et al. | 717/140 |
| 2002/0112231 | A1* | 8/2002 | Lundback et al. | 717/170 |
| 2003/0163807 | A1* | 8/2003 | Drake et al. | 717/174 |
| 2004/0139428 | A1* | 7/2004 | Chuang et al. | 717/155 |
| 2004/0199919 | A1* | 10/2004 | Tovinkere | 718/102 |
| 2004/0205744 | A1* | 10/2004 | Chang | 717/168 |
| 2007/0011674 | A1* | 1/2007 | Joo et al. | 717/174 |
| 2007/0130565 | A1* | 6/2007 | Fan et al. | 717/173 |
| 2008/0098398 | A1* | 4/2008 | Heijligers et al. | 718/103 |
| 2008/0134154 | A1* | 6/2008 | Patel et al. | 717/139 |
| 2008/0141243 | A1* | 6/2008 | Sheppard et al. | 717/177 |
| 2008/0256330 | A1* | 10/2008 | Wang et al. | 712/24 |
| 2008/0276262 | A1* | 11/2008 | Munshi et al. | 719/328 |
| 2009/0064095 | A1* | 3/2009 | Wallach et al. | 717/106 |
| 2010/0125651 | A1* | 5/2010 | Zapata et al. | 709/220 |

FOREIGN PATENT DOCUMENTS

| | | |
|---|---|---|
| WO | WO 2008/127622 | 10/2008 |
| WO | WO 2008/127623 | 10/2008 |

OTHER PUBLICATIONS

Burgstaller et al., An Embedded Systems Programming Environment for C*, published by Springer-Verlag Berlin Heidelberg 2006, Euro-Par 2006, LNCS 4128, pp. 1204-1215.*

Mac OS Runtime Architectures for system 7 Trhough Mac OS 9, published on Jan. 31, 1997 by Apple Computer, Inc, pp. 1-292.*

"Fat Binary", Wikipedia, *The Free Encyclopedia*, last revision: Feb. 24, 2008, pp. 1-3, http://en.wikipedia.org/w/index.php?title=Fat_binary&oldid=193735285.

Apple, "Chapter 7—Fat Binary Programs", *Inside Macintosh: Mac OS Runtime Architectures*, Mar. 11, 1997, http://developer.apple.com/documentation/mac/runtimehtml/RTArch-86.html#HEADING86-0.

Apple, "Creating Fat Binary Programs", *Inside Macintosh: Mac OS Runtime Architectures*, Chapter 7—Fat Binary Programs, Mar. 11, 1997. http://developer.apple.com/documentation/mac/runtimehtml/RTArch-87.html.

Apple, "Accelerated and Fat Resources", *Inside Macintosh: Mac OS Runtime Architectures*, Chapter 7—Fat Binary Programs, Mar. 11, 1997, pp. 1-4. http://developer.apple.com/documentation/mac/runtimehtml/RTArch-88.html.

Apple, "The Code Fragment Resource", *Inside Macintosh: Mac OS Runtime Architectures*, Chapter 1—CFM-Based Runtime Architecture / The Structure of Fragments, Mar. 11, 1997, pp. 1-6. http://developer.apple.com/documentation/mac/runtimehtml/RTArch-25.html.

Eggers, et al. "Simultaneous Multithreading: A Platform for Next-Generation Processors," *IEEE Micro*, vol. 17, No. 5, pp. 12-19, Sep./Oct. 1997.

* cited by examiner

SYSTEM AND METHOD FOR REPRESENTING AND MANAGING A MULTI-ARCHITECTURE CO-PROCESSOR APPLICATION PROGRAM

BACKGROUND OF THE INVENTION

1. Field of the Invention

Embodiments of the present invention relate generally to computer graphics and more specifically to a system and method for representing and managing a multi-architecture co-processor application program.

2. Description of the Related Art

Modern computer systems typically include a central processing unit (CPU) and at least one co-processing unit, such as a graphics processing unit (GPU). The CPU executes instructions associated with software modules, including, without limitation, an operating system and drivers that control and manage the operation of the GPU. The CPU and GPU may cooperatively execute a co-processor enabled application program, which includes a first set of instructions executed by the CPU and a second set of instructions executed by the GPU.

Early generations of GPU architectures provide limited programmability, which is predominately directed to executing functions for graphics shading and rendering. Source code for these functions is conventionally stored and managed by the first set of instructions executing on the CPU, and associated with the co-processor enabled application program. The co-processor enabled application program submits the source code to a GPU driver executing on the CPU that is configured to compile and link the source code into GPU-specific program fragments for execution on an attached GPU, using a just-in-time (JIT) regime. Because the GPU driver targets the currently attached GPU in each new compilation of the source code, new GPU architectures are usually accommodated by a new GPU driver that is developed and distributed in conjunction with the new GPU devices. Importantly, this JIT compilation strategy enables existing application programs to operate transparently with new GPU devices, thereby preserving the investment of both the co-processor enabled application program developer and the co-processor enabled application program customer.

Recent generations of GPU devices have increased computational throughput, programmability and storage capacity relative to previous generations of devices. With these increased capabilities, GPUs are being used to execute substantially larger, more complex functions within co-processor enabled application programs. These larger functions frequently require long compile times that are inappropriate for JIT compilation. With a long compile time, for example, users may experience an unacceptably protracted start-up time when launching a co-processor application program.

One approach to avoid long compilation times is to incorporate pre-compiled GPU machine code within the co-processor enabled application program. In this approach, pre-compiled GPU code fragments may be incorporated into the application program as a code bundle representing every known GPU at compile time. However, as new GPU generations become available, such a pre-compiled code bundle is likely to encounter new GPU devices and underlying architectures that were not anticipated at compile time. Thus, this approach does not provide forward compatibility for co-processor enabled application programs and, more importantly, does not preserve developer or customer investment in these types of applications.

As the foregoing illustrates, what is needed in the art is a technique for providing fast application program start-up as well as forward GPU compatibility for co-processor enabled application programs.

SUMMARY OF THE INVENTION

One embodiment of the present invention sets forth a method for configuring an application program for execution on a hardware platform that includes a primary processing unit and a co-processing unit. The method includes the steps of, for an assumed virtual architecture for the co-processing unit, compiling and linking device source code included in a non-executable version of the application program to generate device virtual assembly code, for an assumed real architecture for the co-processing unit, translating at least a portion of the device virtual assembly code to generate device machine code, and storing both the device virtual assembly code and the device machine code in a device code repository included with or within an executable version of the application program.

One advantage of the disclosed method is that the first stage of compilation incorporates a majority of the computationally intensive processing steps associated with co-processor code compilation. The first stage generates virtual assembly code from the source code. The second stage generates co-processor machine code from the virtual assembly. Both the virtual assembly and co-processor machine code may be included within the co-processor enabled application program. A co-processor driver uses a description of the real architecture of the currently available co-processor to select between virtual assembly and co-processor machine code. If the virtual assembly code is selected, then the co-processor driver compiles the virtual assembly into machine code for the current co-processor. In this fashion, virtual assembly may be used to generate the necessary machine code for the current co-processor, without much computational expense, in situations where the compiled co-processor machine code is not the best match with the current co-processor real architecture. Such functionality enables the application program to be compatible with multiple co-processor real architectures without rewriting and compiling the device source code for new or different co-processor real architectures.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
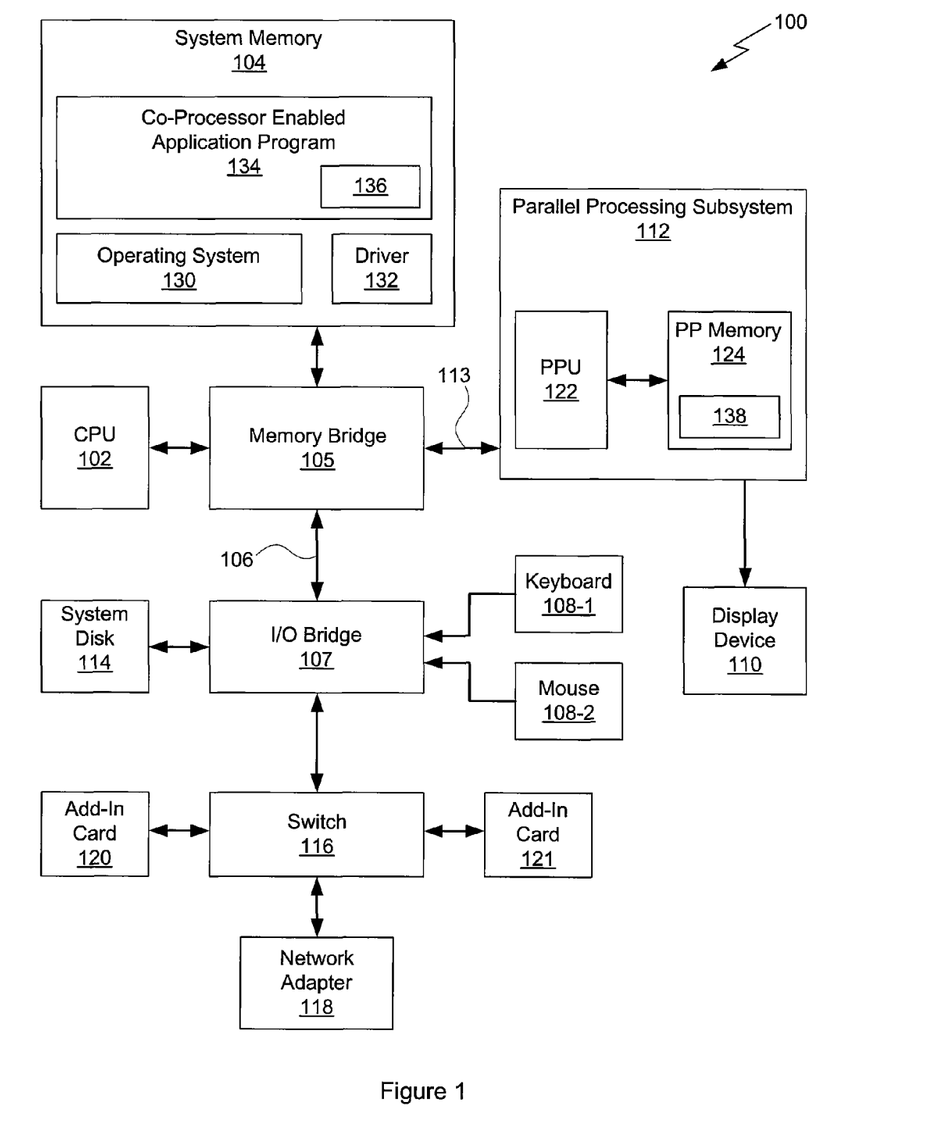
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link). In one embodiment, parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Parallel processing subsystem 112 includes a parallel processing unit (PPU) 122 and a parallel processing (PP) memory 124, which may be implemented, for example, using one or more integrated circuit devices such as programmable processors, application specific integrated circuits (ASICs), and memory devices. PPU 122 advantageously implements a highly parallel processor that includes one or more processing cores, each of which is capable of executing a large number of threads concurrently. PPU 122 can be programmed to perform a wide array of computations over various types of data. PPU 122 may transfer data from system memory 104 and/or PP memory 124 into internal memory (not shown) for processing. Results may be written to system memory 104 for access by other system components, such as the CPU 102. In some embodiments, PP subsystem 112 may include one PPU 122 operating as a graphics processor and a second PPU 122 configured to perform general-purpose computations. The PPUs 122 may be identical or different, and each PPU may have independent PP memory 124.

The CPU 102 operates as the control processor of computer system 100, managing and coordinating the operation of other system components. In particular, CPU 102 issues commands that control the operation of PPU 122. In some embodiments, CPU 102 writes a stream of commands for PPU 122 to a command buffer (not shown), which may reside in system memory 104, PP memory 124, or another storage location accessible to both CPU 102 and PPU 122. PPU 122 reads the command stream from the command buffer and executes commands asynchronously with respect to the operation of CPU 102.

System memory 104 includes an executing image of an operating system 130, a driver 132, and a co-processor enabled application program 134. The operating system 130 provides the detailed instructions for managing and coordinating the operation of computer system 100. The driver 132 provides detailed instructions for managing and coordinating operation of the parallel processing subsystem 112, and in particular the PPU 122. Furthermore, driver 132 provides compilation facilities for generating machine code specifically optimized for PPU 122. A co-processor enabled application program 134 incorporates instructions configured to execute on the CPU 102 and PPU functions 136 implemented in an abstract format, such as virtual assembly, and configured to easily map to machine code for PPU 122. The machine code for PPU 122 may be stored in system memory 104 or in PP memory 124 as a set of PPU code fragments 138.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture. In yet another embodiment, the parallel processing subsystem 112 may be integrated with one or more other system elements, such as the memory bridge 105, CPU 102, and I/O bridge 107 to form a system on chip (SoC).

Persons skilled in the art will recognize that the present invention is not limited in any way by the architecture of FIG. 1.

Figure 2:
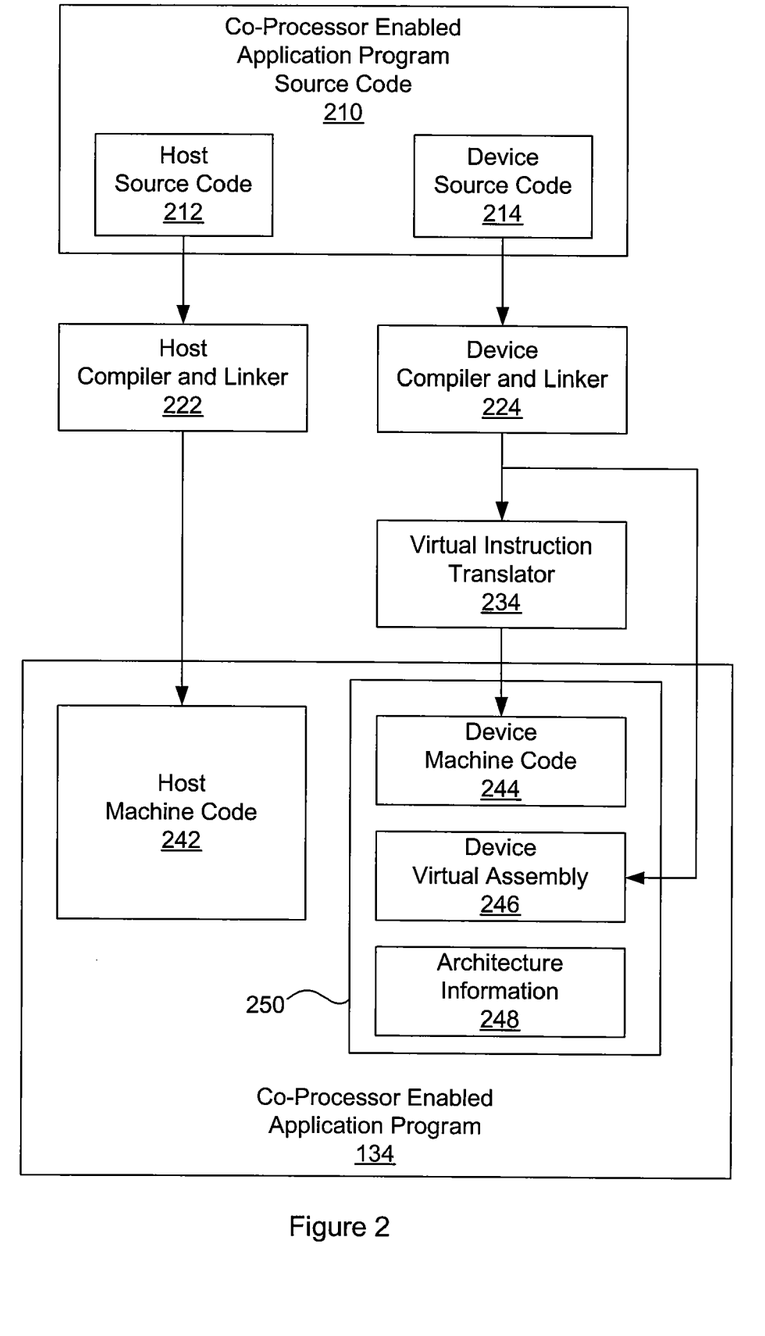
FIG. 2 illustrates the build process used to compile a co-processor enabled application program, according to one embodiment of the present invention.

FIG. 2 illustrates the build process used to compile the co-processor enabled application program 134 of FIG. 1, according to one embodiment of the present invention. Co-processor enabled application program source code 210 includes host source code 212 and device source code 214. The host source code 212 incorporates programming instructions intended to execute on a host, such as an x86-based personal computer (PC) or server. The programming instructions in source code 212 may include calls to functions defined in the device source code 214. Any technically feasible mechanism may be used to specify which functions are designated as device source code 214.

Host source code 212 is pre-processed, compiled, and linked by a host compiler and linker 222. The host compiler and linker 222 generates host machine code 242, which is stored within the co-processor enabled application program 134.

Device source code 214 is pre-processed, compiled and linked by a device compiler and linker 224. This compile operation constitutes a first stage compile of the device source code 214. The device compiler and linker 224 generates device virtual assembly 246, which is stored within a device code repository 250, residing with or within the co-processor enabled application program 134. A virtual instruction translator 234 may generate device machine code 224 from the device virtual assembly 246. This compile operation constitutes a second stage compile of the device source code 214. The virtual instruction translator 234 may generate more than one version of the device machine code 244, based on the availability of known architecture definitions. For example, the virtual instruction translator 234 may generate a first version of device machine code 244, which invokes native 64-bit arithmetic instructions (available in the first target architecture) and a second version of device machine code 244, which emulates 64-bit arithmetic functions on targets that do not include native 64-bit arithmetic instructions.

Architectural information 248 indicates the real architecture version used to generate the device machine code 244. The real architecture version defines the features that are implemented in native instructions within a real execution target, such as the PPU 122. Architectural information 248 also indicates the virtual architecture version used to generate the device virtual assembly 246. The virtual architecture version defines the features that are assumed to be either native or easily emulated and the features that are not practical to emulate. For example, atomic addition operations are not practical to emulate at the instruction level, although they may be avoided altogether at the algorithmic level in certain cases and, therefore, impact which functions may be compiled in the first compile stage.

In addition to the device machine code 244 and device virtual assembly 246, the device code repository also includes architecture information 248, which indicates which architectural features were assumed when the device machine code 244 and device virtual assembly 246 where generated. Persons skilled in the art will recognize that the functions included within device machine code 244 and virtual assembly 246 reflect PPU functions 136 for the real architecture of PPU 122. The architecture information 248 provides compatibility information for device machine code 244 and compiler hints for a second stage compile operation, which may be performed by a driver 132 at some time after the development of the co-processor enabled application program 240 has already been completed.

Figure 3:
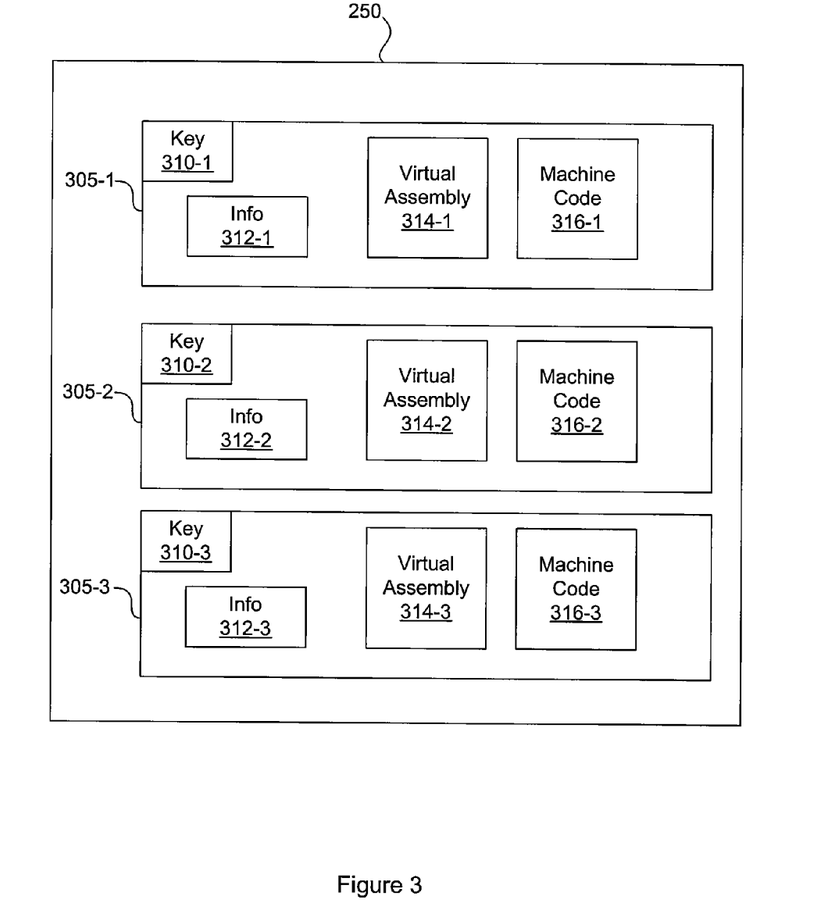
FIG. 3 illustrates a device code repository, according to one embodiment of the present invention.

FIG. 3 illustrates a device code repository 250, according to one embodiment of the present invention. Each function defined in the device source code 214 of FIG. 2 is stored as a multi-architecture function 305 within the device code repository 250. Each multi-architecture function 305 includes a key 310, information 312 and at least one version of virtual assembly 314. The key 310 is a hash function derived from the original source code of the function. Persons skilled in the art will recognize that hash functions may be used to generate relatively small, unique identifier tags, which may be used as the key 310, from arbitrarily large sets of data. In one embodiment, the pre-processed text of the function description code is hashed with a plain text comment describing the function to generate the key 310. Information 312 indicates, on a per-function basis, which architectural features were assumed when the machine code 316 and virtual assembly 314 where generated. Information 312 constitutes one element, of potentially many similar elements, stored in architecture information 248.

Virtual assembly 314 includes instructions to perform the function specified by the key 310 using a virtual instruction set architecture. Virtual assembly 314 is one element, of potentially many elements, stored in device virtual assembly 246, and corresponds to a specific implementation of a function defined in device source code 214. Machine code 316 includes instructions to perform the function specified by the key 310 using a real instruction set architecture. Machine code 316 corresponds to a specific implementation of a function defined in device source code 214. Furthermore, machine code 316 may have been derived from one instance of virtual assembly 314. The device code repository 250 may incorporate an arbitrary number of machine code and virtual assembly implementations of a given function.

Figure 4:
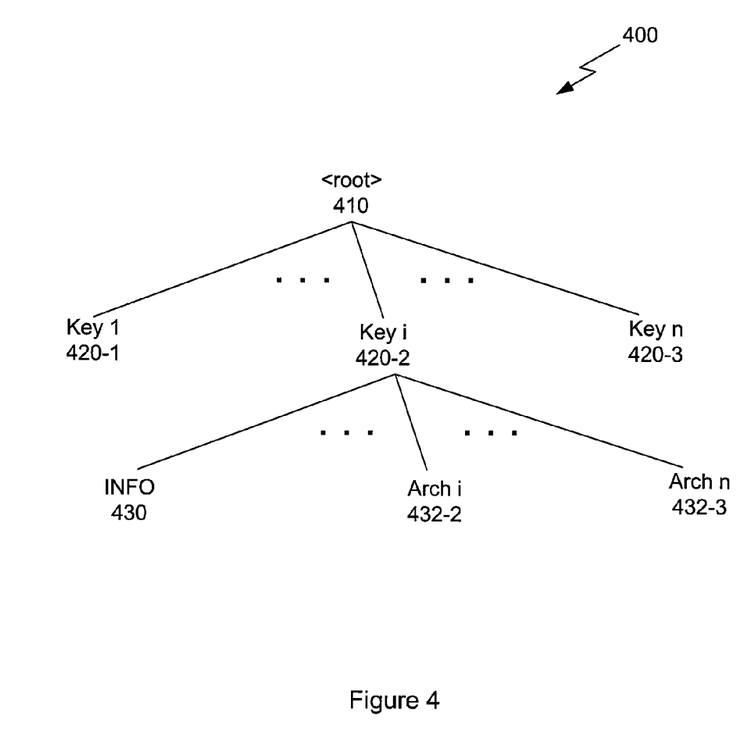
FIG. 4 illustrates the organization of functions within a device code repository, according to one embodiment of the present invention.

FIG. 4 illustrates the organization of functions within a device code repository 400, according to one embodiment of the present invention. The device code repository 400 may be implemented as a set of directories and files within a file system provided by an operating system. Alternately, the device code repository 400 may be implemented as an embedded file system or set of data structures configured to emulate a file system. In one embodiment, the embedded file system used to construct the device code repository 400 resides within the driver 132.

Root 410 defines the reference point for locating all data included within the device repository 400. Each function 305 uniquely defined within device code repository 250 of FIG. 2 is represented by a key 420 situated below the root 410 within device code repository 400. An arbitrary number of keys 420 may reside within the device code repository 400, whereby each key represents an implementation of a unique function 305. Each architectural implementation 432 is based on a set of architectural assumptions, as defined by an information element (INFO) 430, also associated with the key 420. Each architectural implementation 432 may correspond to a virtual or real architecture (e.g., virtual assembly 314, machine code 316).

Device code repository 250 is an external device code repository relative to device code repository 400 and may be structured similarly. One function of driver 132 of FIG. 1 is to incorporate functions from external device code repositories into device code repository 400, which provides a central resource for any co-processor enabled application program to access functions stored therein. Additional functions and associated keys 420 may also be included in device code repository 400, independent of any external device code repositories.

Figure 5:
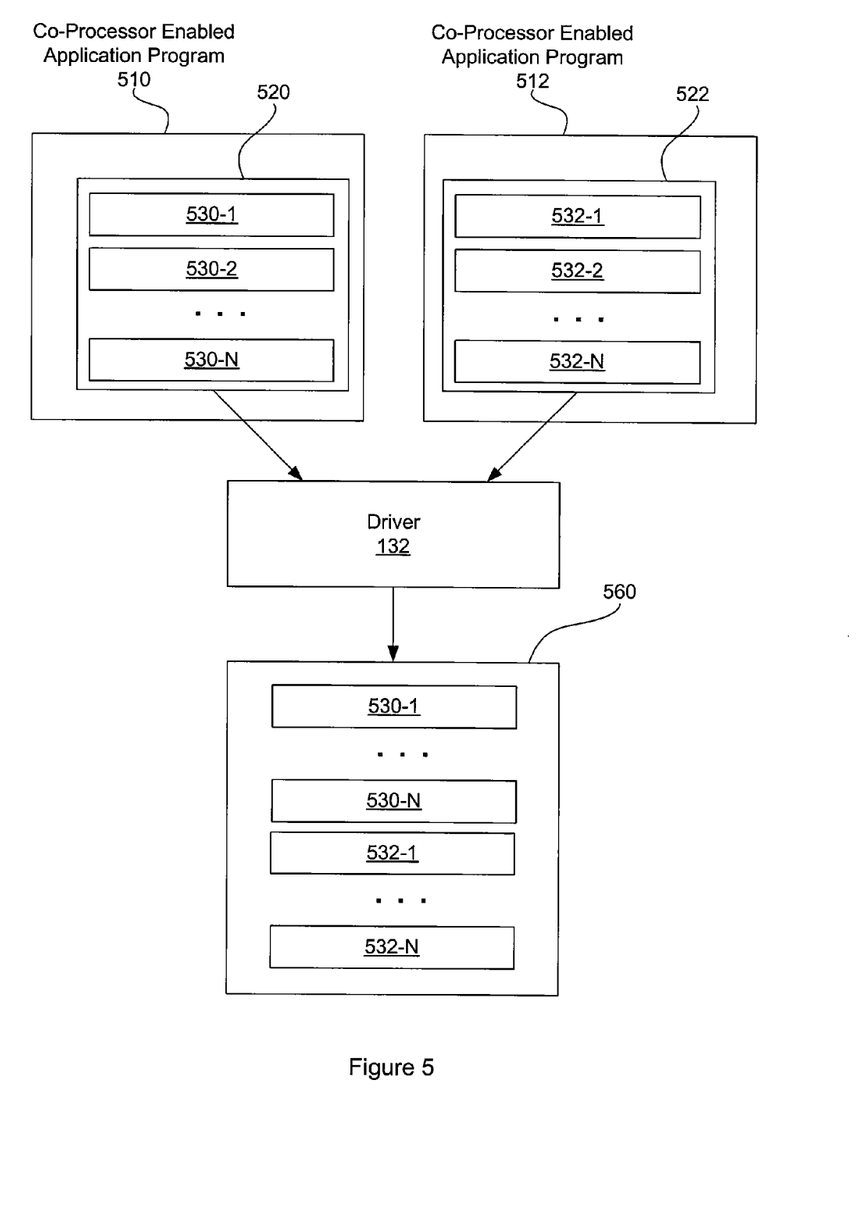
FIG. 5 illustrates unification of multiple device code repositories into a unified device code repository, according to one embodiment of the present invention.

FIG. 5 illustrates unification of multiple device code repositories 520, 522 into a unified device code repository 560, according to one embodiment of the present invention. Each co-processor enabled application program 510, 512 includes a respective device code repository 520, 522. Device code repository 520 includes multi-architecture functions 530, which are incorporated into device code repository 560. Device code repository 522 includes multi-architecture functions 532, which are incorporated into device code repository 560. As described previously in FIG. 3, each of the multi-architecture functions 530, 532 includes a unique key. Importantly, each key is globally unique across all co-processor enabled application programs stored on the computer system 100.

Figure 6:
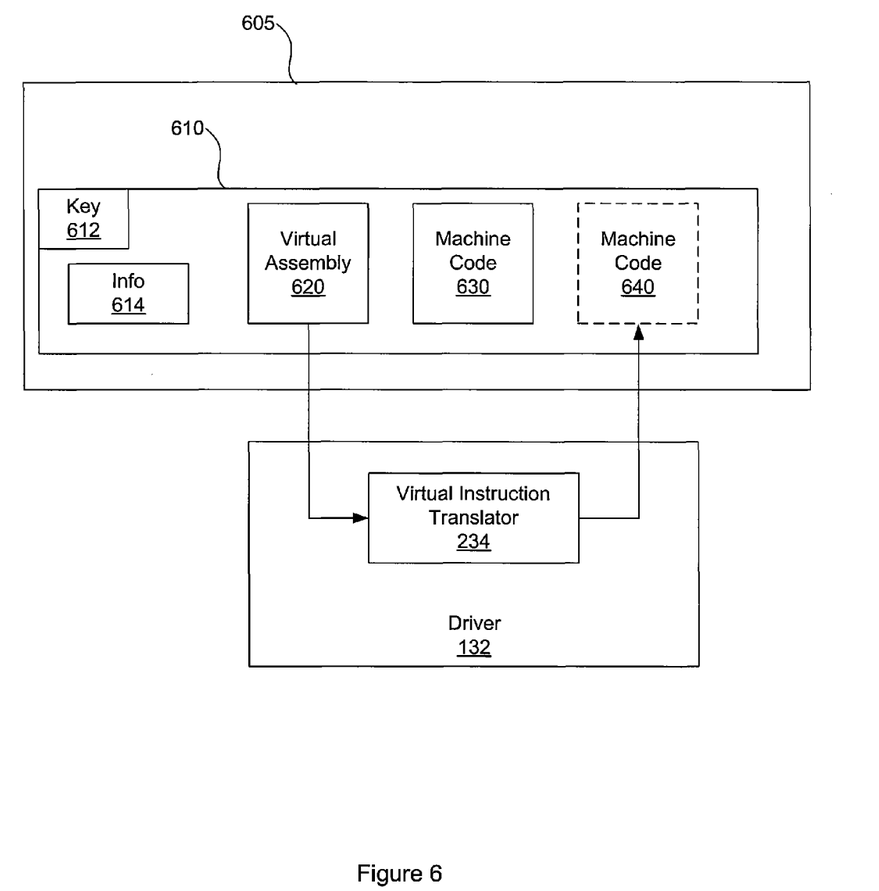
FIG. 6 illustrates compilation of virtual assembly into a new machine code representation, according to one embodiment of the present invention.

The driver 132 generates and maintains the unified device code repository 560, providing optimal machine code versions of each function for use by a given co-processor enabled application program. The driver 132 also provides compilation facilities capable of reading previous or current architectural versions of virtual assembly and generating machine code for current versions of the PPU 122, as illustrated in FIG. 6, below. In one embodiment, the unified device code repository 560 is maintained within the driver 132. In alternative embodiments, the unified device code repository 560 may be maintained as a set of files and directories in a file system (e.g., stored on the disk system 114 of FIG. 1) that can be accessed by the driver 132.

FIG. 6 illustrates compilation of virtual assembly 620 into a new machine code representation 640, according to one embodiment of the present invention. Device code repository 605 includes a multi-architecture function 610. The multi-architecture function 610 includes a key 612, which uniquely identifies the function 610 and info 614, which specifies which architectural version was used to generate each implementation of the function 610. Suppose that a first implementation, virtual assembly 620, was generated from "version 2" of a virtual assembly architectural specification, and a second implementation, machine code 630, was generated from "version 3" of a real machine code architectural specification. With virtual assembly 620 and machine code 630 compiled, the device code repository 605 is completed and shipped to a customer as part of a co-processor enabled application program. Upon arrival, the customer installs the co-processor enabled application program with the device code repository 605 on a computer system 100. Suppose further that the computer system includes PPU 122, which incorporates machine code architectural "version 5," a much later and incompatible version of real hardware compared to the available machine code 630 derived from "version 3" of the real machine code architecture. In such a scenario, the driver 132 invokes the virtual instruction translator 234 to translate the virtual assembly 620 into machine code 640, based on "version 5" of a real hardware architecture. Importantly, "version 5" of the real hardware architecture is known to driver 132, because driver 132 was installed in computer system 100 as part of the system build that included installation of the recent PPU 122.

Figure 7:
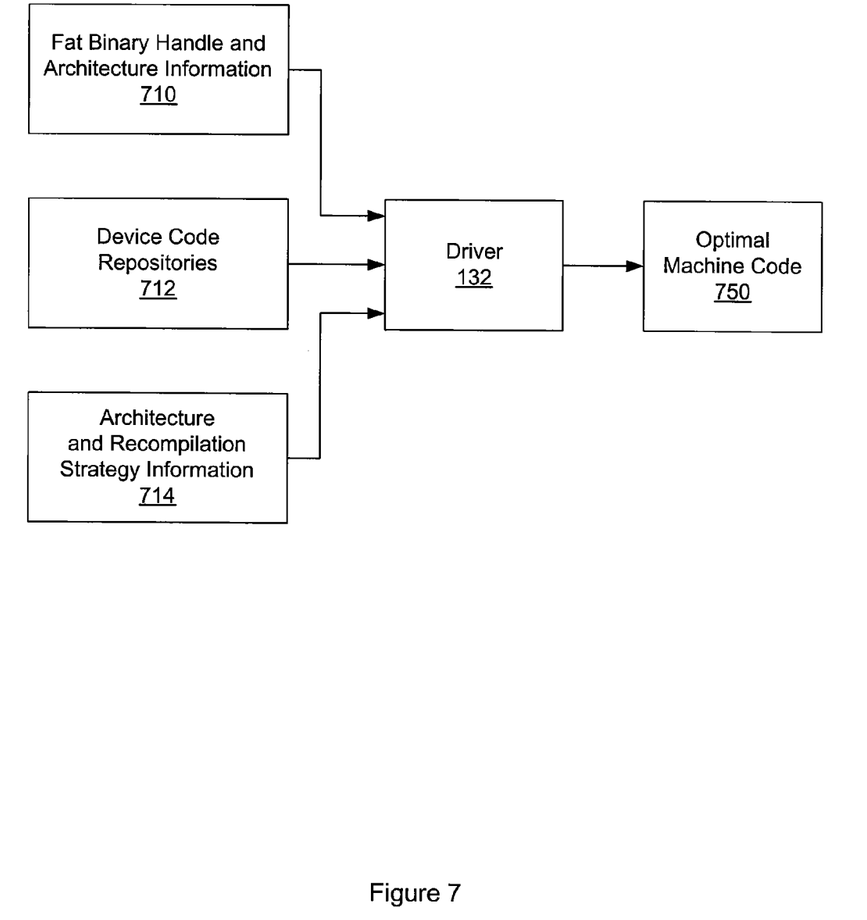
FIG. 7 illustrates data inputs used by the driver to generate optimal machine code, according to one embodiment of the present invention.

FIG. 7 illustrates data inputs used by the driver to generate optimal machine code 750, according to one embodiment of the present invention. A fat binary refers to a binary image containing device code fragments that target multiple processor architectures. For example, a set of multi-architecture functions 305 within the device code repository 250 would constitute a fat binary. A handle to a fat binary and related architectural information 710 may be presented to the driver 132, which may then extract and process one or more of the multi-architecture functions included in the fat binary for storage in the unified device code repository 560 of FIG. 5. Device code repositories 712 may include the device code repositories found in the compiled co-processor enabled application programs or may include a unified device code repository. Again, one operating assumption is that the driver will be at least as up-to-date as the PPU 122 of FIG. 1. By incorporating architecture and recompilation strategy information 714 that details the relationships between various versions of virtual and real architectures, the driver may then provide optimal machine code 750 for each function to be executed on the available PPU 122, as described below in FIG. 8.

Figure 8:
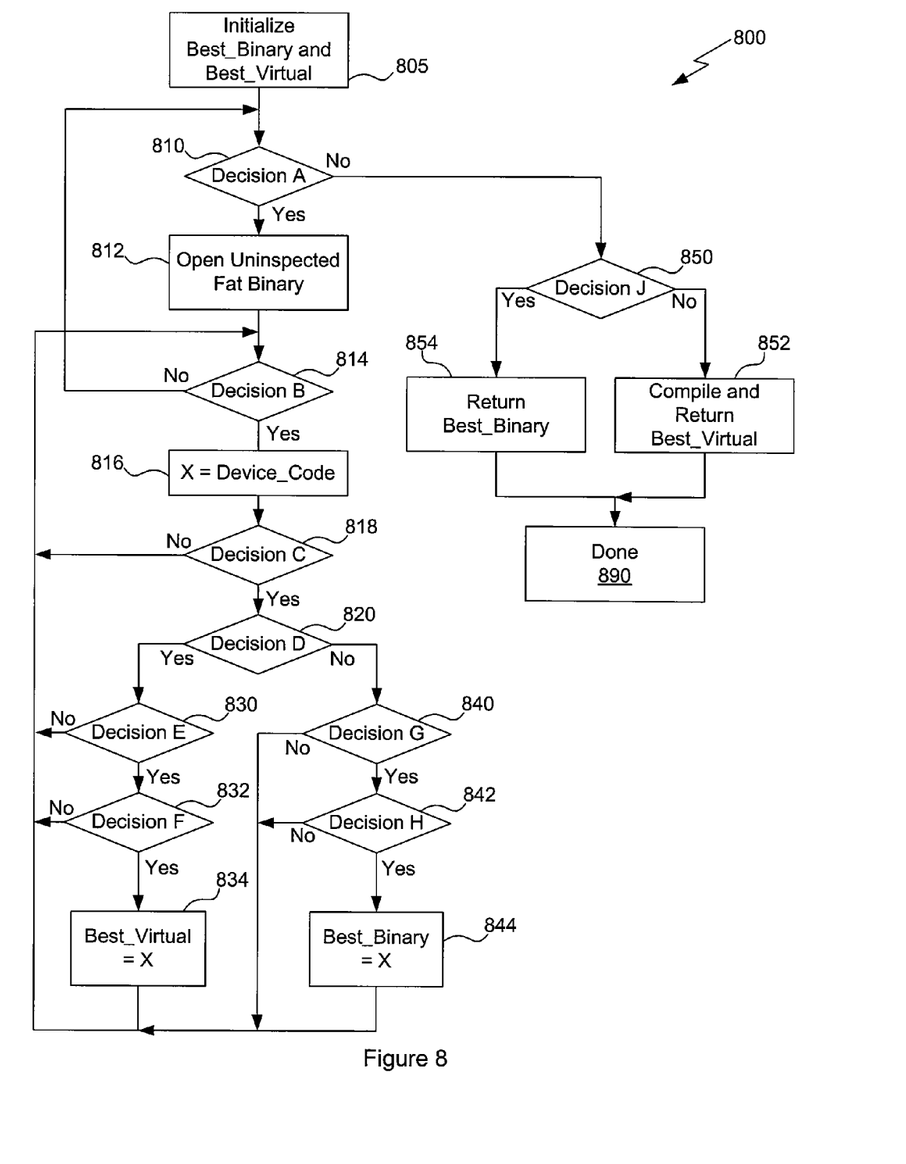
FIG. 8 is a flow diagram of method steps for determining which architecture version should be used to invoke a device function call and, optionally, to generate optimal machine code prior to execution, according to one embodiment of the present invention.

FIG. 8 is a flow diagram of method steps 800 for determining which architecture version should be used to invoke a device function call and optionally to generate optimal machine code prior to execution, according to one embodiment. Although the method steps are described in conjunction with the systems of FIGS. 1 and 2, persons skilled in the art will understand that any system that performs the method steps, in any order, is within the scope of the invention.

The method begins in step 805, where the driver 132 initializes values for two variables, Best_Binary and Best_Virtual. The default initialization value for both variables is "none." However, if a relevant implementation of the requested device function is available, e.g., if there is a machine code version of the device function that aligns with the real architecture of the PPU 112, then the driver 132 may update the value of either variable. In one embodiment, the driver 132 receives an explicit reference to both the device function key and implementation, in the form of function call parameters, to the requested device function. In alternative embodiments, the driver 132 may search for relevant implementations of the device function by searching for the device function key, transmitted to the driver as a function call parameter, in one or more previously inspected device code repositories, such as the unified device code repository 560 of FIG. 5. If the driver 132 finds a relevant machine code implementation, either by explicit reference or by searching previously inspected device code repositories, the Best_Binary (the best available machine code) variable may be assigned to reference that machine code, as described in greater detail below. Alternately, in the event that there is no relevant machine code, if the driver 132 finds a relevant virtual assembly implementation of the requested device function, then the Best_Virtual (the best available virtual assembly) variable may be assigned to reference the relevant virtual assembly code for the requested device function.

In step 810, the driver 132 performs decision A 810, which entails determining if an uninspected fat binary exists. For example, if driver 132 has previously inspected all functions associated with fat binary handle and architecture information 710, along with each of the device code repositories 712 of FIG. 7, then there are no uninspected fat binaries. If all fat binaries have already been inspected (or if there are no fat binaries), then the method proceeds to step 850, where the driver 132 performs decision J, which entails determining if the feature set from which the Best_Binary is compiled is "better" than the feature set from which the Best_Virtual is compiled. In a situation where there is no relevant machine code compiled for the device function or where the feature set from which the relevant machine code is compiled is older than the feature set from which the Best_Virtual is compiled, the Best_Virtual would be considered "better." In other embodiments, other technically feasible and appropriate measures of "better" may be used. If the feature set associated with the Best_Binary is "better" than the feature set associated with the Best_Virtual, then the method proceeds to step 854, where a reference to the existing Best_Binary is returned to invoke the requested device function using the Best_Binary implementation. The method terminates in step 890.

Returning now to step 850, if the feature set from which the Best_Binary is compiled is not "better" than the feature set from which Best_Virtual is compiled, then the method proceeds to step 852. In step 852, the virtual assembly associated with the Best_Virtual is compiled into machine code and may replace or augment the previous Best_Binary for the presently attached PPU 122. The newly compiled machine code may also be stored within the unified device code repository 560 of FIG. 5. A reference to the newly compiled machine code is returned to invoke the requested device function using this newly compiled machine code version of the Best_Virtual.

Returning now to step 810, if an uninspected fat binary does exist, then the method proceeds to step 812, where the driver 132 opens the uninspected fat binary. Each time step 812 is visited within the method, the driver 132 may proceed to a subsequent fat binary in a list of uninspected fat binaries. The list of uninspected fat binaries may be updated separately. In step 814, the driver 132 performs decision B, which entails determining if the uninspected fat binary includes either an uninspected machine code implementation or an uninspected virtual assembly implementation of the requested function. As described above in FIGS. 3 and 4, an uninspected function presents a new key value to the driver 132, whereas an uninspected implementation presents a new architectural implementation relative to a known key value to the driver 132. If the uninspected fat binary does not contain an uninspected machine code implementation or an uninspected virtual assembly implementation, then the method returns to step 810, described above.

Returning now to step 814, if the uninspected fat binary does contain either an uninspected machine code implementation or an uninspected virtual assembly implementation, then the method proceeds to step 816. In step 816, a reference (X) is set to refer to the fat binary where uninspected device code resides (X=Device_Code). In step 818, the driver 132 performs decision C, which entails determining if the key value (function source hash) associated with the uninspected device code is equal to the key value (function source hash) associated with the requested device function. If the key value associated with the uninspected device code is not equal to the key value associated with the requested device function, then the uninspected device code is not related to the requested device function and the method returns to step 814, described above.

Returning now to step 818, if the key value associated with the uninspected device code is equal to the key value associated with the requested device function, then the method proceeds to step 820. In step 820, the driver 132 performs decision D, which entails determining if the uninspected device code is uninspected virtual assembly. If the uninspected device code is uninspected virtual assembly, then the method proceeds to step 830, where the driver 132 performs decision E. In decision E, the driver 132 determines if the feature set of the virtual architecture for which the uninspected virtual assembly is compiled is supported in the feature set of the current PPU 122. If the feature set of the virtual architecture of the uninspected virtual assembly is not supported by the current PPU 122, then the requested device function will not be able to execute on the current PPU 122 via the uninspected virtual assembly, and the method returns to step 814, described above. One skilled in the art will appreciate that the method 800 presupposes that at least one valid implementation of the requested device function exists within at least one fat binary for proper function of the method.

Returning now to step 830, if the feature set of the virtual architecture of the uninspected virtual assembly is supported by the current PPU 122, then the method proceeds to step 832, where the driver 132 performs decision F. In decision F, the driver 132 determines if the feature set of the virtual architecture of the uninspected virtual assembly is "better" than the feature set of the Best_Virtual associated with the device function. If, in step 832, the feature set of the virtual architecture of the uninspected virtual assembly is not "better" than the feature set of the Best_Virtual, associated with the device function, then the method proceeds to step 814. Returning to step 832, if the feature set of the virtual architecture of the uninspected virtual assembly is "better" than the feature set of the Best_Virtual, associated with the device function, then the method proceeds to step 834. In step 834, Best_Virtual variable is set to refer to the (previously) uninspected virtual assembly residing within the recently inspected fat binary and associated via key values with the requested device function. The method then proceeds to step 814, described above.

Returning now to step 820, if the uninspected device code is not virtual assembly (and is therefore uninspected machine code), then the method proceeds to step 840, where the driver 132 performs decision G, which entails determining if the uninspected machine code was compiled using a feature set supported by the current PPU 122. If the uninspected machine code is compiled using a feature set that is not supported by the current PPU 122, then the method proceeds to step 814. Returning to step 840, if the uninspected machine code is compiled using a feature set that is supported by the current PPU 122, then the method proceeds to step 842.

In step 842, the driver 132 performs decision H, which entails determining if the feature set of the real architecture of the uninspected machine code is "better" than the feature set of the Best_Binary, associated with the device function. If, in step 832, the feature set of the real architecture of the uninspected virtual assembly is not "better" than the feature set of the Best_Binary, associated with the device function, then the method proceeds to step 814. Returning to step 842, if the feature set of the real architecture of the uninspected machine code is "better" than the feature set of the Best_Binary, associated with the device function, then the method proceeds to step 844.

In step 844, the Best_Binary variable is set to refer to the (previously) uninspected machine code residing within the recently inspected fat binary and associated via key values with the requested device function. The method then proceeds to step 814, described above.

In sum, a technique is disclosed for representing and managing a multi-architecture co-processor application program. Source code for device functions is compiled in two stages. The first stage generates virtual assembly for a virtual instruction set architecture and may be performed as a static compilation step when building the co-processor enabled application program. The second stage generates machine code for a real architecture that may be executed by a co-processing unit. Each function designated to execute on the co-processor includes code that is stored within a device code repository. The code within the repository is organized first by a unique hash key that identifies the function and second by architecture, which implies availability of certain features. The driver for the co-processor incorporates functions from each application into a unified device code repository, availing each function within the repository to each application. The driver for the co-processor inspects information within the application device code repository that defines architectural features of the available code. If appropriate machine code is available for a given function, then the driver invokes the machine code when the function is called to execute. If machine code is not available, then the virtual instruction translator within the driver compiles the best available virtual assembly into a new instance of machine code for the currently targeted co-processor. The new instance of machine code is stored in the device code repository and used for future invocations of the function.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A method for configuring an application program for execution on a hardware platform that includes a primary processing unit and a co-processing unit, the method comprising:
    for an assumed virtual architecture for the co-processing unit, compiling and linking device source code included in a non-executable version of the application program to generate device virtual assembly code;
    for an assumed real architecture for the co-processing unit, translating at least a portion of the device virtual assembly code to generate device machine code; and
    storing both the device virtual assembly code and the device machine code in a device code repository included within an executable version of the application program.

2. The method of claim 1, wherein the assumed real architecture defines a plurality of features that are implemented in native instructions within an actual execution target, and the assumed virtual architecture defines a plurality of features that are assumed to be native to an actual execution target or can be emulated for the actual execution target.

3. The method of claim 2, wherein the steps of compiling and linking the device source code, translating at least a portion of the generated device virtual assembly code, and storing both the generated device virtual assembly code and the generated device machine code in the device code repository are repeated for one or more assumed virtual architectures for the co-processing unit and one or more assumed real architectures for the co-processing unit.

4. The method of claim 3, wherein the device code repository includes one or more multi-architecture functions reflected in the device source code, and, for each multi-architecture function, the device code repository further includes:
    one or more virtual assembly elements, wherein each virtual assembly element reflects the multi-architecture function compiled and linked for a particular assumed virtual architecture.

5. The method of claim 4, wherein, for each multi-architecture function, the device code repository further includes one or more machine code elements.

6. The method of claim 5, wherein each of the one or more machine code elements reflects the multi-architecture function translated for a particular assumed real architecture or is derived from one of the one or more virtual assembly elements.

7. The method of claim 4, wherein the device code repository further includes a key for each multi-architecture function that uniquely identifies the multi-architecture function.

8. The method of claim 7, wherein, for each multi-architecture function, the key is generated based on a hash of at least a portion of the device source code related to the multi-architecture function.

9. The method of claim 7, wherein the device code repository further includes information for each multi-architecture function indicating the features of each of the assumed virtual architectures used to generate the one or more virtual assembly elements.

10. The method of claim 9, wherein the device code repository is organized in a tree structure that includes a root node, a key node connected to the root node for each multi-architecture function included in the device code repository, wherein each key node indicates the key generated for a different one of the multi-architecture functions, and, for each key node, an architecture node connected to the key node for each virtual assembly element generated for the multi-architecture function associated with the key node, an architecture node connected to the key node for each machine code element generated for the multi-architecture function associated with the key node, and an information node connected to the key node indicating the features of each of the assumed virtual architectures used to generate the one or more virtual assembly elements for the multi-architecture function associated with the key node.

11. A non-transitory computer-readable medium that includes instructions that, when executed by a processing unit, cause the processing unit to configure an application program for execution on a hardware platform that includes a primary processing unit and a co-processing unit, by performing the steps of:
    for an assumed virtual architecture for the co-processing unit, compiling and linking device source code included in a non-executable version of the application program to generate device virtual assembly code;
    for an assumed real architecture for the co-processing unit, translating at least a portion of the device virtual assembly code to generate device machine code; and
    storing both the device virtual assembly code and the device machine code in a device code repository included within an executable version of the application program.

12. The non-transitory computer-readable medium of claim 11, wherein the assumed real architecture defines a plurality of features that are implemented in native instructions within an actual execution target, and the assumed virtual architecture defines a plurality of features that are assumed to be native to an actual execution target or can be emulated for the actual execution target.

13. The non-transitory computer-readable medium of claim 12, wherein the steps of compiling and linking the device source code, translating at least a portion of the generated device virtual assembly code, and storing both the generated device virtual assembly code and the generated device machine code in the device code repository are repeated for one or more assumed virtual architectures for the co-processing unit and one or more assumed real architectures for the co-processing unit.

14. The non-transitory computer-readable medium of claim 13, wherein the device code repository includes one or more multi-architecture functions reflected in the device source code, and, for each multi-architecture function, the device code repository further includes:
    one or more virtual assembly elements, wherein each virtual assembly element reflects the multi-architecture function compiled and linked for a particular assumed virtual architecture.

15. The non-transitory computer-readable medium of claim 14, wherein, for each multi-architecture function, the device code repository further includes one or more machine code elements.

16. The non-transitory computer-readable medium of claim 15, wherein each of the one or more machine code elements reflects the multi-architecture function translated for a particular assumed real architecture or is derived from one of the one or more virtual assembly elements.

17. The non-transitory computer-readable medium of claim 14, wherein the device code repository further includes a key for each multi-architecture function that uniquely identifies the multi-architecture function.

18. The non-transitory computer-readable medium of claim 17, wherein, for each multi-architecture function, the key is generated based on a hash of at least a portion of the device source code related to the multi-architecture function.

19. The non-transitory computer-readable medium of claim 17, wherein the device code repository further includes information for each multi-architecture function indicating the features of each of the assumed virtual architectures used to generate the one or more virtual assembly elements.

20. The non-transitory computer-readable medium of claim 19, wherein the device code repository is organized in a tree structure that includes a root node, a key node connected to the root node for each multi-architecture function included in the device code repository, wherein each key node indicates the key generated for a different one of the multi-architecture functions, and, for each key node, an architecture node connected to the key node for each virtual assembly element generated for the multi-architecture function associated with the key node, an architecture node connected to the key node for each machine code element generated for the multi-architecture function associated with the key node, and an information node connected to the key node indicating the features of each of the assumed virtual architectures used to generate the one or more virtual assembly elements for the multi-architecture function associated with the key node.

\* \* \* \* \*